(12) United States Patent
Zhou

(10) Patent No.: US 11,336,397 B2
(45) Date of Patent: May 17, 2022

(54) HARQ FEEDBACK METHOD AND APPARATUS, DEVICE, AND COMPUTER READABLE STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 37 days.

(21) Appl. No.: 16/610,774

(22) PCT Filed: May 5, 2017

(86) PCT No.: PCT/CN2017/083180
§ 371 (c)(1),
(2) Date: Nov. 4, 2019

(87) PCT Pub. No.: WO2018/201433
PCT Pub. Date: Nov. 8, 2018

(65) Prior Publication Data
US 2020/0162201 A1 May 21, 2020

(51) Int. Cl.
*H04W 72/04* (2009.01)
*H04L 1/18* (2006.01)
(Continued)

(52) U.S. Cl.
CPC .......... *H04L 1/1812* (2013.01); *H04L 1/1607* (2013.01); *H04L 1/1829* (2013.01); *H04L 5/0055* (2013.01)

(58) Field of Classification Search
CPC ... H04L 1/1812; H04L 1/1607; H04L 1/1829; H04L 1/1614; H04L 1/1864; H04L 5/0055
See application file for complete search history.

(56) References Cited

U.S. PATENT DOCUMENTS 9,450,742 B2   9/2016 Li et al.
2016/0119948 A1 4/2016 Damnjanovic et al.
(Continued)

FOREIGN PATENT DOCUMENTS

CN   101667900 A   3/2010
CN   102055558 A   5/2011
(Continued)

OTHER PUBLICATIONS

First Office Action in CN 201780000387.2 dated Jun. 3, 2020.
(Continued)

*Primary Examiner* — Hassan Kizou
*Assistant Examiner* — Mahbubul Bar Chowdhury
(74) *Attorney, Agent, or Firm* — Syncoda LLC; Feng Ma

(57) ABSTRACT

A HAQR feedback method includes: receiving data transmitted from a transmitting end in a unit of a transmission block (TB), which includes a plurality of resource units; generating HARQ feedback information based on the resource units according to a pre-configured HARQ feedback policy, and returning the HARQ feedback information to the transmitting end, wherein the amount of feedback information units of the HARQ feedback information is smaller than the amount of the resource units contained in the TB.

8 Claims, 8 Drawing Sheets

(51) Int. Cl.
*H04L 1/16* (2006.01)
*H04L 5/00* (2006.01)

(56) References Cited

U.S. PATENT DOCUMENTS

| | | | | |
|---|---|---|---|---|
| 2016/0337087 | A1* | 11/2016 | Chen | H04L 1/1822 |
| 2017/0303284 | A1* | 10/2017 | Xu | H04L 1/0026 |
| 2018/0287744 | A1* | 10/2018 | Sundararajan | H04L 1/1819 |
| 2019/0020444 | A1* | 1/2019 | Froberg Olsson | H04L 1/1819 |
| 2019/0181986 | A1* | 6/2019 | Kitamura | H04L 1/1819 |
| 2019/0342053 | A1* | 11/2019 | Peng | H04L 5/0053 |
| 2020/0008216 | A1* | 1/2020 | Iyer | H04W 72/04 |
| 2020/0059327 | A1* | 2/2020 | Kini | H04L 1/1812 |
| 2020/0084004 | A1* | 3/2020 | Wang | H04L 1/1671 |
| 2020/0195386 | A1* | 6/2020 | Marinier | H04L 1/1896 |

FOREIGN PATENT DOCUMENTS

| | | |
|---|---|---|
| CN | 102055577 A | 5/2011 |
| CN | 103580827 A | 2/2014 |
| CN | 104301077 A | 1/2015 |
| CN | 106576249 A | 4/2017 |

OTHER PUBLICATIONS

Extended European Search Report in EP 17908313.4 dated Apr. 9, 2020.
International Search Report in PCT/CN2017/083180 dated Jan. 26, 2018.
Discussion on HARQ-Ack Feedback Mechanisms (R1-1705834) 3GPP TSG RAN WG1 Meeting, Spokane, USA, Apr. 3-7, 2017.
LG Electronics, "Discussion on CB group based HARQ-ACK feedback," 3GPP TSG RAN WG1 Meeting #88bis R1-1704918, Apr. 7, 2017.
CN 2nd Office Action in Application No. 201780000387.2, dated Feb. 26, 2021.
Lenovo et al:"Discussion on enhanced HARQ feedback and CBG-based partial retransmission", 3GPP TSG RAN WG1 Meeting #88bis, Spokane, USA Apr. 3-7, 2017, R1-1705653.
India 1st Office Action in Application No. 201927047017, dated Feb. 25, 2021.
CN Notice of Allowance in Application No. 201780000387.2, dated Aug. 18, 2021.

* cited by examiner

HARQ FEEDBACK METHOD AND APPARATUS, DEVICE, AND COMPUTER READABLE STORAGE MEDIUM

CROSS-REFERENCE TO RELATED APPLICATION

This application is a national stage of International Application No. PCT/CN2017/083180 filed on May 5, 2017, the disclosure of which is hereby incorporated by reference in its entirety.

TECHNICAL FIELD

The present disclosure relates to communication technologies, and more particularly, to an HARQ feedback method and device, an apparatus and a computer readable storage medium.

BACKGROUND

With development of the communication technologies, the 5th Generation (5G) Mobile Communication Technology has emerged. At present, types of service of 5G at least comprise enhanced Mobile Broad Band (eMBB), massive Machine Type Communication (MMTC), Ultra Reliable Low Latency Communication (URLLC), and etc. The services are all data services, and have different requirements for latency and reliability. For example, URLLC services are applicable to fields that require low latency, like Internet of vehicles, and have high requirements for timeliness; meanwhile, the establishing of services needs to be performed in time, and the URLLC services are even preemptive over the previous services. The mMTC services are usually not so sensitive to latency and can send data at a relatively long time interval. A way to achieve efficient transmission of latency-sensitive services is to improve the transmission of Hybrid Automatic Repeat Request (HARQ), for example, to make retransmission feedback faster and more accurate.

In Long Term Evolution (LTE), HARQ feedback is performed in a unit of Transmission Blocks (TBs), each of which feeds back an acknowledgement (ACK) or non-acknowledgement (NACK) message of 1-bit. In order to improve the accuracy of retransmission, the 3rd Generation Partnership Project (3GPP) proposes to perform retransmission based on a Code Block Group (CBG), wherein CBGs are a smaller unit of data cells in a TB and one CBG corresponds to ACK or NACK feedback of 1 bit. Since retransmission is performed with a smaller granularity, a position of transmission error can be more accurately determined, so as to make the retransmission more accurate. Moreover, the retransmission efficiency becomes higher because of a smaller amount of data to be retransmitted.

SUMMARY

In view of this, the present application discloses an HARQ feedback method and device, an apparatus and a computer readable storage medium, to reduce feedback overhead.

According to a first aspect of embodiments of the present disclosure, there is provided a hybrid automatic repeat request HARQ feedback method, comprising:

receiving data transmitted from a transmitting end in a unit of a transmission block (TB), which contains a plurality of resource units;

generating HARQ feedback information based on the resource units according to a pre-configured HARQ feedback policy, and returning the HARQ feedback information to the transmitting end, wherein an amount of feedback information units of the HARQ feedback information is smaller than an amount of the resource units contained in the TB.

In an embodiment, generating the HARQ feedback information based on the resource units according to the pre-configured HARQ feedback policy comprises:

binding feedback information of the resource units into one feedback information unit on at least one feedback level according to the HARQ feedback policy so as to generate the HARQ feedback information.

In an embodiment, the HARQ feedback policy comprises:

feedback levels and an amount of the feedback information units corresponding to each of the feedback levels; or, feedback levels and an amount of the resource units bound to one feedback information unit of each of the feedback levels; or, feedback levels, an amount of the feedback information units corresponding to the respective feedback levels, and an amount of the resource units bound to one feedback information unit at the respective feedback levels;

wherein the sum of the amount of all of the feedback information units corresponding to all of the feedback levels is smaller than the amount of the resource units contained in the TB.

In an embodiment, the HARQ feedback policy comprises:

feedback levels and an amount of the feedback information units corresponding to each of the feedback levels;

the feedback levels comprise: a first feedback level;

binding the feedback information of the resource units into one feedback information unit on at least one feedback level according to the HARQ feedback policy so as to generate the HARQ feedback information comprises:

determining a first preset amount of the feedback information units corresponding to the first feedback level according to the HARQ feedback policy;

binding the feedback information corresponding to the resource units contained in the TB to the first preset amount of feedback information units, respectively;

obtaining data reception state information, which is configured to indicate data reception success or data reception failure corresponding to each of the resource units; and generating first-level feedback information corresponding to the first feedback level according to the obtained data reception state information, wherein the HARQ feedback information comprises the first-level feedback information.

In an embodiment, the feedback levels further comprise: a second feedback level;

binding the feedback information of the resource units into one feedback information unit on at least one feedback level according to the HARQ feedback policy so as to generate the HARQ feedback information further comprises:

determining a first-level feedback information indicative of data reception failure according to the data reception state information;

determining a second preset amount of the feedback information units corresponding to the second feedback level according to the HARQ feedback policy;

binding all or part of the first-level feedback information indicative of the data reception failure to the second preset amount of feedback information units, respectively; and generating a second-level feedback information corresponding to the second feedback level according to the data reception state information, wherein the HARQ feedback information further comprises the second-level feedback information.

In an embodiment, binding all or part of the first-level feedback information indicative of the data reception failure to the second preset amount of feedback information units, respectively, comprises:

determining, if the first-level feedback information which is indicative of the data reception failure is greater than one feedback information unit, the first-level feedback information of at least one feedback information unit which is indicative of the data reception failure, according to the HARQ feedback policy; and binding the determined first-level feedback information of the at least one feedback information unit into the second preset amount of feedback information units, respectively.

In an embodiment, the HARQ feedback policy comprises: the feedback levels and the amount of the resource units bound to one feedback information unit of each of the feedback levels;

the amount of the feedback levels is one;

binding the feedback information of the resource units into one feedback information unit on at least one feedback level according to the HARQ feedback policy so as to generate the HARQ feedback information comprises:

binding the feedback information corresponding to the resource units contained in the TB into a third preset amount of feedback information units, respectively, wherein the third preset amount is equal to a rounding-up amount of a value, which is obtained through dividing the amount of the resource units contained in the TB by the amount of the resource units bound one feedback information unit in the feedback level is bound;

obtaining data reception state information, which is configured to indicate data reception success or data reception failure corresponding to each of the resource units; and generating the HARQ feedback information according to the data reception state information.

In an embodiment, the HARQ feedback policy further comprises at least one of:

a first indication information, which is configured to indicate that the HARQ feedback information is returned to the transmitting end in an explicit manner or in an implicit manner; and a second indication information, which is configured to indicate that a sum of the amount of the feedback information units used in all of the feedback levels remains constant or variable.

In an embodiment, the first indication information is configured to indicate that the HARQ feedback information is returned to the transmitting end in an implicit manner; and the HARQ feedback policy further comprises: scrambling sequence and a scrambled data location.

In an embodiment, the feedback levels comprise: a first feedback level and a second feedback level, and wherein the scrambled data location is a location of the first-level feedback information and the second-level feedback information is scrambled to the first-level feedback information in the form of a scrambling code and sent to the transmitting end.

In an embodiment, the transmitting end comprises a base station or a User Equipment (UE).

In an embodiment, when the transmitting end is a base station, the method further comprises:

receiving the HARQ feedback policy transmitted from the transmitting end.

According to a second aspect of embodiments of the present disclosure, there is provided a hybrid automatic repeat request HARQ feedback device, comprising:

a data receiving module configured to receive data transmitted from a transmitting end in a unit of a transmission block (TB), which contains a plurality of resource units;

a generating return module configured to generate HARQ feedback information based on the resource units contained in the TB corresponding to the data received by the data receiving module according to a pre-configured HARQ feedback policy, and return the HARQ feedback information to the transmitting end, wherein an amount of feedback information units of the HARQ feedback information is smaller than an amount of the resource units contained in the TB.

In an embodiment, the generating return module is configured to:

bind feedback information of the resource units into one feedback information unit on at least one feedback level according to the HARQ feedback policy so as to generate the HARQ feedback information.

In an embodiment, the HARQ feedback policy comprises:

feedback levels and an amount of the feedback information units corresponding to each of the feedback levels; or, feedback levels and an amount of the resource units bound to one feedback information unit of each of the feedback levels; or, feedback levels, an amount of the feedback information units corresponding to each of the feedback levels and an amount of the resource units bound to one feedback information unit of each of the feedback levels;

wherein the sum of the amount of all of the feedback information units corresponding to all of the feedback levels is smaller than the amount of the resource units contained in the TB.

In an embodiment, the HARQ feedback policy comprises: feedback levels and the amount of the feedback information units corresponding to each of the feedback levels;

the feedback levels comprise: a first feedback level;

the generating return module comprises:

a first determining sub-module configured to determine a first preset amount of the feedback information units corresponding to the first feedback level according to the HARQ feedback policy;

a first binding sub-module configured to bind feedback information corresponding to the resource units contained in the TB respectively to the first preset amount of feedback information units determined by the first determining sub-module;

a first acquiring sub-module configured to acquire data reception state information, which is configured to indicate data reception success or data reception failure corresponding to each of the resource units; and a first generating sub-module configured to generate first-level feedback information corresponding to the first feedback level according to the data reception state information obtained by the first obtaining sub-module, wherein the HARQ feedback information comprises the first-level feedback information.

In an embodiment, the feedback levels further comprise: a second feedback level;

the generating return module further comprises:

a second determining sub-module configured to determine a first-level feedback information indicative of data reception failure according to the data reception state information acquired by the first acquiring sub-module;

a third determining sub-module configured to determine a second preset amount of feedback information units corresponding to the second feedback level according to the HARQ feedback policy;

a second binding sub-module configured to bind part or all of the first-level feedback information indicative of the data reception failure determined by the second determining sub-module respectively to the second preset amount of feedback information units determined by the third determining sub-module; and a second generating sub-module configured to generate second-level feedback information corresponding to the second feedback level according to the data reception state information, wherein the HARQ feedback information further comprises the second-level feedback information.

In an embodiment, the second binding sub-module comprises:

a determining unit configured to determine, if the first-level feedback information which is indicative of the data reception failure is greater than one feedback information unit, the first-level feedback information of at least one feedback information unit which is indicative of the data reception failure, according to the HARQ feedback policy; and a binding unit configured to bind the first-level feedback information of the at least one feedback information unit determined by the determining unit respectively to the second preset amount of feedback information units.

In an embodiment, the HARQ feedback policy comprises: the feedback levels and the amount of the resource units bound to one feedback information unit of each of the feedback levels;

an amount of the feedback levels is one;

the generating return module further comprises:

a third binding sub-module configured to bind the feedback information corresponding to the resource units contained in the TB respectively to a third preset amount of feedback information units, wherein the third preset amount is equal to a rounding-up amount of a value, which is obtained through dividing the amount of the resource units contained in the TB by the amount of the resource units bound to one feedback information unit in the feedback level; and a second acquiring sub-module configured to acquire data reception state information, which is configured to indicate data reception success or data reception failure corresponding to each of the resource units; and a third generating sub-module configured to generate the HARQ feedback information according to the data reception state information acquired by the second obtaining sub-module.

In an embodiment, the HARQ feedback policy further comprises at least one of:

first indication information, which is configured to indicate that the HARQ feedback information is returned to the transmitting end in an explicit manner or in an implicit manner; and second indication information, which is configured to indicate that the sum of the amount of the feedback information units used in all of the feedback levels remains constant or variable.

In an embodiment, the first indication information is configured to indicate that the HARQ feedback information is returned to the transmitting end in an implicit manner; and the HARQ feedback policy further comprises: scrambling sequence and a scrambled data location.

In an embodiment, the feedback levels comprise: a first feedback level and a second feedback level, wherein the scrambled data location is a location of the first-level feedback information and the second-level feedback information is scrambled to the first-level feedback information in a form of a scrambling code and sent to the transmitting end.

In an embodiment, the transmitting end comprises a base station or an UE.

In an embodiment, the transmitting end is a base station, the method further comprises:

a policy receiving module configured to receive the HARQ feedback policy transmitted from the transmitting end before the generating return module generates the HARQ feedback information based on the resource units contained in the TB corresponding to the data received by the data receiving module according to a pre-configured HARQ feedback policy.

According to a third aspect of embodiments of the present disclosure, there is provided an apparatus, comprising:

a processor;

a storage for storing instructions executable by the processor;

wherein the processor is configured to:

receive data transmitted from a transmitting end in a unit of a transmission block (TB), which contains a plurality of resource units;

generate HARQ feedback information based on the resource units according to a preconfigured HARQ feedback policy, and return the HARQ feedback information to the transmitting end, wherein an amount of feedback information units of the HARQ feedback information is less than an amount of the resource units contained in the TB.

According to a fourth aspect of embodiments of the present disclosure, there is provided a computer readable storage medium having computer programs (instructions) stored thereon, which, when executed by the processor, carry out the steps of the above-described method.

The technical solutions provided by the embodiments of the present disclosure can produce the following beneficial effects:

A HARQ feedback information based on resource units is generated according to a pre-configured HARQ feedback policy, so that an amount of the feedback information units of the HARQ feedback information is less than an amount of the resource units contained in the TB, thereby achieving the purpose of saving feedback overhead.

The feedback information of the resource units is bound to one feedback information unit on at least one feedback level according to the HARQ feedback policy, so that the amount of the feedback information units of the HARQ feedback information is less than the amount of the resource units contained in the TB, thereby providing conditions for saving feedback overhead.

By describing contents of the HARQ feedback policy, conditions are provided for generating the HARQ feedback information according to the HARQ feedback policy.

A feedback information corresponding to resource units contained in a TB is bound to the first preset amount of feedback information units respectively, and the first-level feedback information corresponding to the first feedback level is generated according to the obtained data reception state information, so that the first-level feedback information can reflect the data reception state corresponding to the resource units bound to each feedback information unit, so as to determine data to be retransmitted by the transmitting end based on this.

The second feedback level is added and the second-level feedback information corresponding to the second feedback level is generated, so that the second-level feedback information can reflect the data reception state corresponding to the resource units bound to each feedback information unit in a smaller granularity, thus the transmitting end determines data to be retransmitted based on this, so as to reduce the amount of data retransmitted by the transmitting end.

The determined first-level feedback information of the at least one feedback information unit is bound respectively to the second preset amount of feedback information units, and all or part of the first-level feedback information indicative of the data reception failure is bound respectively to the second preset amount of feedback information units, so as to provide conditions for generating the second-level feedback information.

The feedback information corresponding to the resource units contained in the TB is bound to the third preset amount of feedback information units respectively, and the HARQ feedback information is generated according to the acquired data reception state information, so that the HARQ feedback information can reflect the data reception state corresponding to the resource units bound to each feedback information unit, so as to determine data to be retransmitted by the transmitting end based on this.

The HARQ feedback policy can further comprise at least one of the first indication information and the second indication information, so that the HARQ feedback information can be returned to the transmitting end in various ways, so as to reduce the number of bits of feedback information without causing a large amount of data to be retransmitted.

When the first indication information indicates that the HARQ feedback information is returned to the transmitting end in an implicit manner, the HARQ feedback policy can further comprise: scrambling sequence and scrambled data location, which provides conditions for subsequently returning the HARQ feedback information to the transmitting end in an implicit manner.

The second-level feedback information is scrambled to the first-level feedback information in the form of a scrambling code and sent to the transmitting end, to define the manner in which the HARQ feedback information is returned to the transmitting end in an implicit manner, which is easy to be carried out.

The transmitting end comprises a base station or an UE, which indicates that the solutions provided by the present disclosure are applicable to HARQ feedback of both uplink data and downlink data.

When the transmitting end is a base station, receiving of the HARQ feedback policy transmitted from the transmitting end designates the source of the HARQ feedback policy, and also provides conditions for subsequently generating of the HARQ feedback information based on the resource units according to the HARQ feedback policy.

It is to be understood that both the foregoing general description and the following detailed description are exemplary and explanatory only and cannot be construed as a limit to the disclosure.

DETAILED DESCRIPTION

The technical solution of the embodiments of the present disclosure will be descripted clearly and completely in connection with the accompanying drawings of the present disclosure. Obviously, the illustrated embodiments are not all of the embodiments of the present disclosure, but only a part of them. According to the embodiments of the present disclosure, all of the other embodiments obtained by one of ordinary skill in the art without any creative work fall into the protection scope of the present disclosure.

Figure 1:
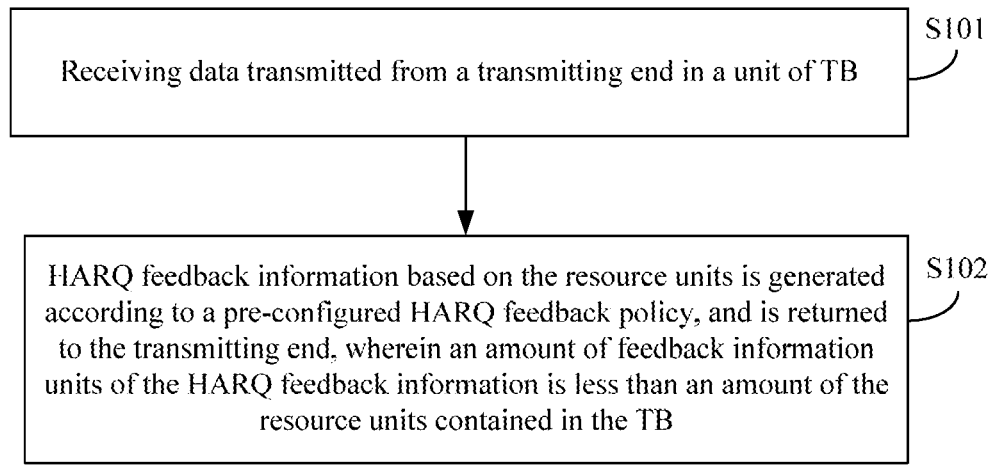
FIG. 1 is a flowchart illustrating an HARQ feedback method according to an exemplary embodiment of the present disclosure.

Embodiments of the present disclosure provide an HARQ feedback method. FIG. 1 is a flowchart illustrating an HARQ feedback method according to an exemplary embodiment of the present disclosure. As illustrated in FIG. 1, the HARQ feedback method comprises the following steps.

In step S101, receiving data transmitted from a transmitting end in a unit of TB, which comprises a plurality of resource units.

The transmitting end can comprise a base station or an UE (user equipment). If the transmitting end is the base station, the method embodiment is described from the perspective of the UE, namely, the embodiment is applicable to HARQ feedback of downlink data, and if the transmitting end is the UE, the method embodiment is described from the perspective of the base station, namely, the embodiment is applicable to HARQ feedback of uplink data.

Figure 2:
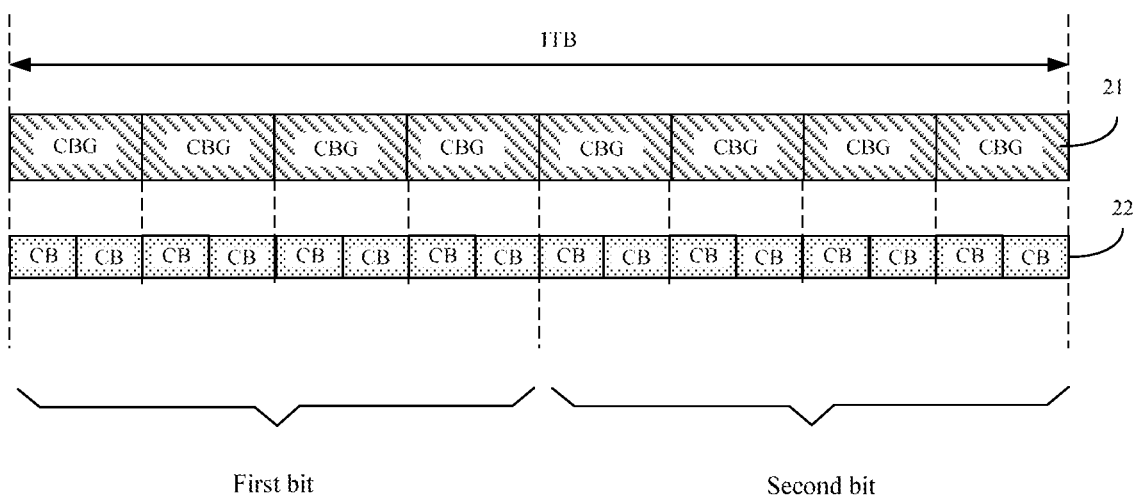
FIG. 2 is a schematic view illustrating a TB comprising a plurality of resource units according to an exemplary embodiment of the present disclosure.

In the embodiment, the resource units can comprise, but not limited to, CBGs or code blocks (CBs) or the like. FIG. 2 is a schematic view illustrating a TB comprising a plurality of resource units according to an exemplary embodiment of the present disclosure. As illustrated in FIG. 2, one TB can comprise a plurality of CBGs 21, each of which can comprise a plurality of Code Blocks (CBs) 22.

Referring back to FIG. 1, in step S102, HARQ feedback information based on the resource units is generated according to a pre-configured HARQ feedback policy, and is returned to the transmitting end, wherein an amount of feedback information units of the HARQ feedback information is less than an amount of the resource units contained in the TB.

In the embodiment, the HARQ feedback policy can comprise: feedback levels and an amount of feedback information units corresponding to each of the feedback levels; or feedback levels and an amount of resource units bound to one feedback information unit of each of the feedback levels; or feedback levels, an amount of feedback information units corresponding to each of the feedback levels and an amount of resource units bound to one feedback information unit of each of the feedback levels. In the embodiment, at least one feedback level can be comprised.

A sum of the amount of all of the feedback information units corresponding to all of the feedback levels is less than the amount of the resource units contained in the TB. The feedback information units can be bit, that is, the sum of the amount of all of the bits corresponding to all of the feedback levels is less than the amount of the resource units contained in the TB. The amount of the feedback levels can be one, two, three or more, and it is not particularly limited in the embodiment.

Further description will be given by taking FIG. 2 as an example. As illustrated in FIG. 2, the resource units can be either CBGs or CBs and the feedback information units are bits. If the resource units are CBG, the sum of the amount of all of the feedback information units corresponding to all of the feedback levels is 2, and the amount of the resource units contained in the TB is 8, that is, the sum of the amount of all of the feedback information units corresponding to all of the feedback levels is less than the amount of the resource units contained in the TB. If the resource units are CBs, the sum of the amount of all of the feedback information units corresponding to all of the feedback levels is 2 and the amount of the resource units contained in the TB is 16, that is, the sum of the amount of all of the feedback information units corresponding to all of the feedback levels is less than the amount of the resource units contained in the TB.

If the transmitting end in the embodiment is the base station, the UE can first receive the HARQ feedback policy sent from the base station, and configures the HARQ feedback policy.

In the embodiment, feedback information of the resource units can be bound to one feedback information unit on at least one feedback level according to the HARQ feedback policy so as to generate a HARQ feedback information. Since the sum of the amount of all of the bits corresponding to all of the feedback levels is less than the amount of the resource units contained in the TB, the number of bits of the generated HARQ feedback information is less than the amount of the resource units contained in the TB. For example, if the resource units are CBGs, the sum of the amount of all of the bits corresponding to all of the feedback levels is less than the amount of the CBGs contained in the TB and if the resource units are CBs, the sum of the amount of all of the bits corresponding to all of the feedback levels is smaller than the amount of the CBs contained in the TB.

In addition, the HARQ feedback policy can further comprise at least one of first indication information and second indication information.

The first indication information is configured to indicate that the HARQ feedback information is returned to the transmitting end in an explicit manner or in an implicit manner. If the first indication information indicates that the HARQ feedback information is returned to the transmitting end in an implicit manner, the HARQ feedback policy can further comprise: scrambling sequence and scrambled data location.

In the embodiment, the feedback levels can comprise: a first feedback level and a second feedback level. The scrambled data location is a location of first-level feedback information and the second-level feedback information can be scrambled to the first-level feedback information in a form of a scrambling code and sent to the transmitting end. Thus, after receiving the feedback information, the transmitting end can parse the first-level feedback information and the second-level feedback information at the same time.

It is to be understood that the above description is merely an example of scrambling, in practical applications, the scrambling is not be limited to the feedback level. For example, when there is only one feedback level, the HARQ feedback information can further be scrambled to other data in the form of a scrambling code and then sent to the transmitting end.

The second indication information is configured to indicate that the sum of the amount of the feedback information units used in all of the feedback levels remains constant or variable. Due to the wider bandwidth in 5G and more dynamic division of time-frequency resources, and as required by services, the TB may have a dynamic length, of course, there may be many CBs in one TB. For one TB, there are the following two cases: the first case, an amount of CBGs comprised in each TB is fixed, and amount of CBs comprised in each CBG are variable, in this case, a total amount of feedback information based on the CBG remains constant; the second case, amount of CBs comprised in one CBG is fixed, and amount of CBGs comprised in one TB is variable, in this case, a total amount of feedback information based on the CBG is variable. For the first case, if there is a long TB, for example, containing 1000 CBs, then each CBG comprises 100 CBs given that the TB constantly contains 10 CBGs, which inevitably results in big data of individual CBG to be retransmitted, thereby reducing efficiency of retransmission, even though the total amount of the feedback information is constant. In the second case, the amount of CBs contained in the CBG can be reduced, and the amount of CBGs in the TB is increased to reduce a size of each CBG, so that the amount of data to be retransmitted data is reduced. However, a problem that amount of the feedback information based on CBG will be changed will rise. Namely, as for the first case and the second case, the former is suitable for a system with a short TB while the latter is suitable for a system with a long TB, and the two cases are applicable to certain types of services, and both could happen. In order to solve the problem that both cases could happen, the second indication information is introduced, which indicates that the sum of the amount of the feedback information units is constant or variable.

In the foregoing embodiment, the HARQ feedback information based on the resource units is generated according to the pre-configured HARQ feedback policy, so that the amount of the feedback information units of the HARQ feedback information is less than the amount of the resource units contained in the TB, thereby achieving the purpose of saving feedback overhead.

In the embodiment, the above-described HARQ feedback policy can comprise: a feedback level and an amount of the resource units bound to one feedback information unit of each feedback level, wherein the amount of the feedback levels is one.

Figure 3A:
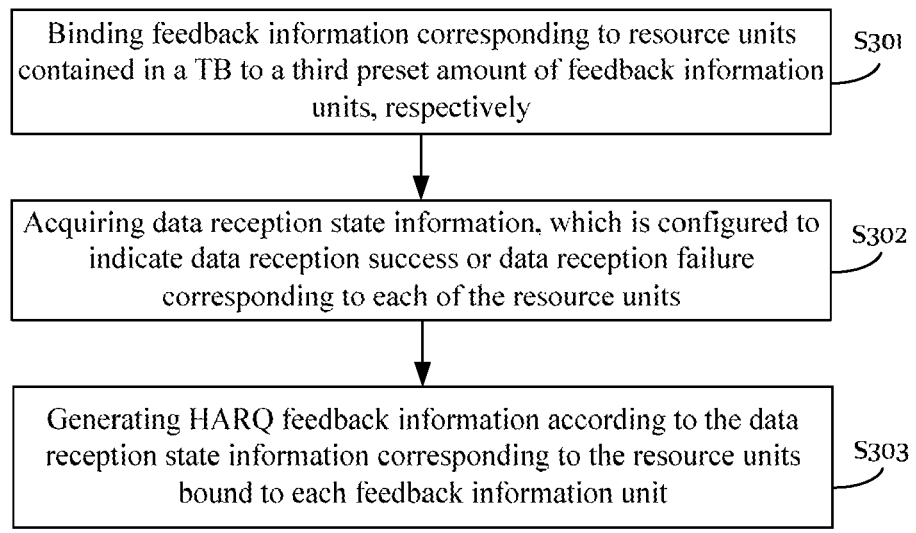
FIG. 3A is a flowchart illustrating a method for generating HARQ feedback information according to an HARQ feedback policy according to an exemplary embodiment of the present disclosure.

FIG. 3A is a flowchart illustrating the generation of HARQ feedback information according to an HARQ feedback policy according to an exemplary embodiment of the present disclosure. As illustrated in FIG. 3A, a method for generating HARQ feedback information according to an HARQ feedback policy comprises the following steps.

S301, feedback information corresponding to resource units contained in a TB is bound to a third preset amount of feedback information units, respectively.

The third preset amount is equal to a rounding-up amount of a value, which is obtained through dividing the amount of the resource units contained in the TB by the amount of the resource units bound to one feedback information unit in a feedback level. It is to be understood that the third preset amount, a first preset amount and a second preset amount that are mentioned below are only configured to designate different preset amounts, namely, the third preset amount can also be referred to as the first preset amount and the first preset amount can also be referred to as the third preset amount.

Figure 3B:
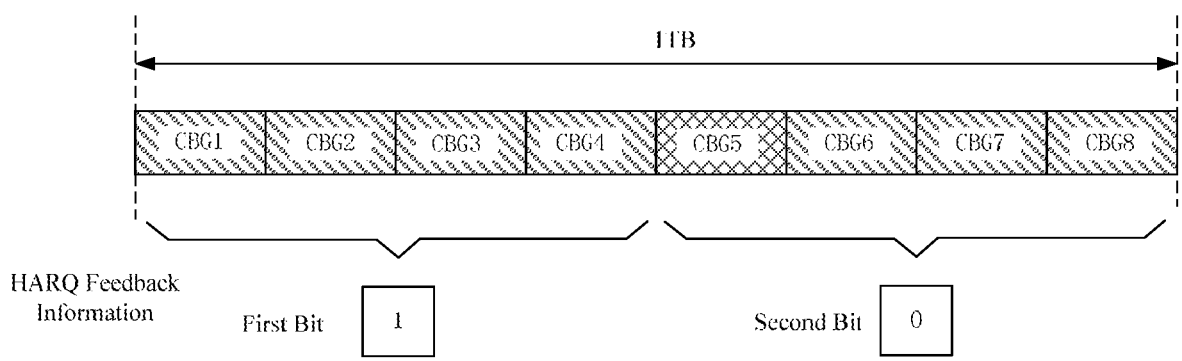
FIG. 3B is a first schematic view illustrating a correspondence relationship between a TB and HARQ feedback information according to an exemplary embodiment of the present disclosure.

In the embodiment, the resource units in the embodiment are CBGs and the feedback information units are bits and the amount of CBGs bound to one bit at the feedback level is 4. Referring to FIG. 3B, which is a schematic view illustrating a correspondence relationship between a TB and HARQ feedback information according to an exemplary embodiment of the present disclosure, as illustrated in FIG. 3B, a TB comprises 8 CBGs and feedback information corresponding to CBG1, CBG2, CBG3 and CBG4 can be bound to the first bit while feedback information corresponding to CBG5, CBG6, CBG7 and CBG8 can be bound to the second bit.

In addition, if the TB comprises 10 CBGs, namely, the TB further comprises CBG9 and CBG10, feedback information corresponding to the CBG9 and CBG10 can be bound to the third bit.

Referring again to FIG. 3A, in step S302, acquiring data reception state information, which is configured to indicate data reception success or data reception failure corresponding to each of the resource units.

As illustrated in FIG. 3B, data reception state information corresponding to 8 CBGs in FIG. 3B is acquired.

Referring again to FIG. 3A, in step S303, HARQ feedback information is generated according to the data reception state information corresponding to the resource units bound to each feedback information unit.

As illustrated in FIG. 3B, each of data reception states corresponding to 4 CBGs bound to the first bit is data reception success, and the HARQ feedback information corresponding to the first bit is a first value which can be 1, and one of data reception states corresponding to 1 CBG of 4 CBGs bound to the second bit is data reception failure (for example, the data reception state corresponding to CBG5 is data reception failure), and HARQ feedback information corresponding to the second bit is a second value which can be 0, thus the HARQ feedback information is 10.

In the foregoing embodiment, the feedback information corresponding to the resource units contained in the TB is bound to the third preset amount of feedback information units respectively, and the HARQ feedback information is generated according to information on the acquired data reception state, so that the HARQ feedback information can reflect the data reception state corresponding to the resource units bound to each feedback information unit, so as to determine data to be retransmitted by the transmitting end based on this.

In the embodiment, the HARQ feedback policy can comprise: feedback levels and the amount of the feedback information units corresponding to each of the feedback levels, wherein the feedback levels can comprise a first feedback level.

Figure 4A:
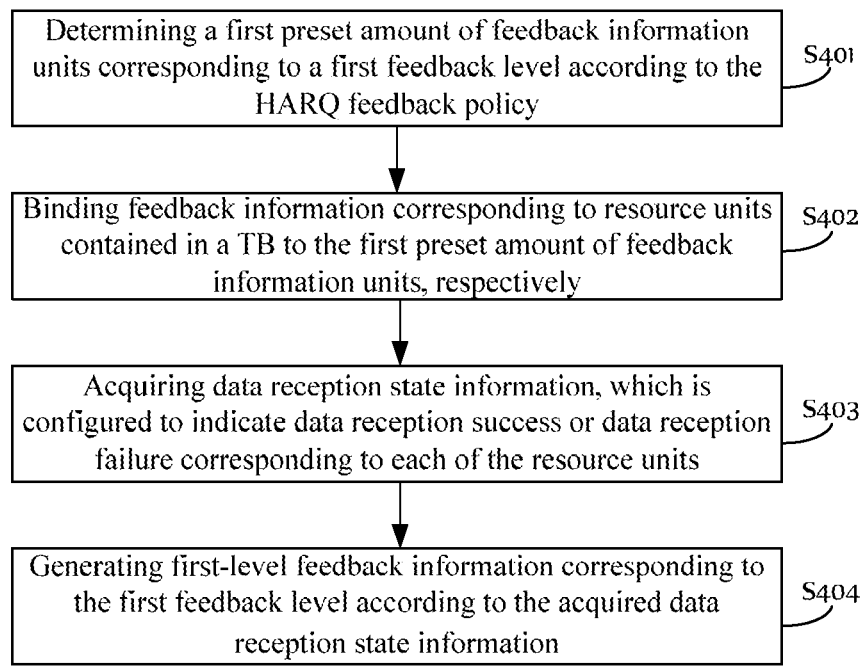
FIG. 4A is a flowchart illustrating another method for generating HARQ feedback information according to an HARQ feedback policy according to an exemplary embodiment of the present disclosure.

Referring to FIG. 4A, which is a flowchart illustrating another method for generating HARQ feedback information based on an HARQ feedback policy according to an exemplary embodiment of the present application, as illustrated in FIG. 4A, the method for generating the HARQ feedback information based on the HARQ feedback policy comprises the following steps.

In step S401, a first preset amount of feedback information units corresponding to a first feedback level is determined according to the HARQ feedback policy.

Since the HARQ feedback policy indicates that the number of bits corresponding to the first feedback level is 2, it can be determined that the first preset amount is 2.

In step S402, feedback information corresponding to resource units contained in a TB is bound to the first preset amount of feedback information units, respectively.

Figure 4B:
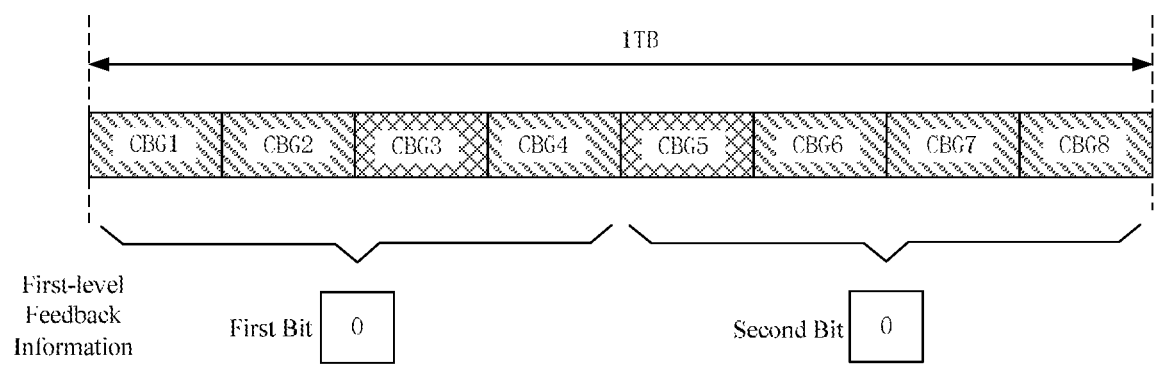
FIG. 4B is a second schematic view illustrating a correspondence relationship between a TB and HARQ feedback information according to an exemplary embodiment of the present disclosure.

In the embodiment, referring to FIG. 4B, which is a second schematic view illustrating a correspondence relationship between a TB and HARQ feedback information according to an exemplary embodiment of the present disclosure. As illustrated in FIG. 4B, the resource units are CBGs and the feedback information units are bits and the first preset amount is 2 and a TB contains 8 CBGs. Therefore, feedback information of 8 CBGs can be bound to 2 bits, namely, the feedback information of CBG1, CBG2, CBG3 and CBG4 can be bound to the first bit and the feedback information of CBG5, CBG6, CBG7 and CBG8 can be bound to the second bit.

Referring again to FIG. 4A, in step S403, data reception state information is acquired, which is configured to indicate data reception success or data reception failure corresponding to each of the resource units.

In step S404, first-level feedback information corresponding to the first feedback level is generated according to the acquired data reception state information, and the HARQ feedback information comprises the first-level feedback information.

As illustrated in FIG. 4B, a data reception state corresponding to 1 CBG of 4 CBGs bound to the first bit is data reception failure (for example, the data reception state corresponding to CBG3 is data reception failure), and HARQ feedback information corresponding to the first bit is a second value which can be 0 and a data reception state corresponding to 1 CBG of 4 CBGs bound to the second bit is data reception failure (for example, the data reception state corresponding to CBG5 is data reception failure), and HARQ feedback information corresponding to the second bit is a second value which can be 0, thus the generated first-level feedback information is 00.

In the foregoing embodiment, the feedback information corresponding to the resource units contained in the TB is bound to the first preset amount of feedback information units respectively, and the first-level feedback information corresponding to the first feedback level is generated according to the acquired data reception state information, so that the first-level feedback information can reflect the data reception state corresponding to the resource units bound to each feedback information unit, so as to determine data to be retransmitted by the transmitting end based on this.

Figure 5A:
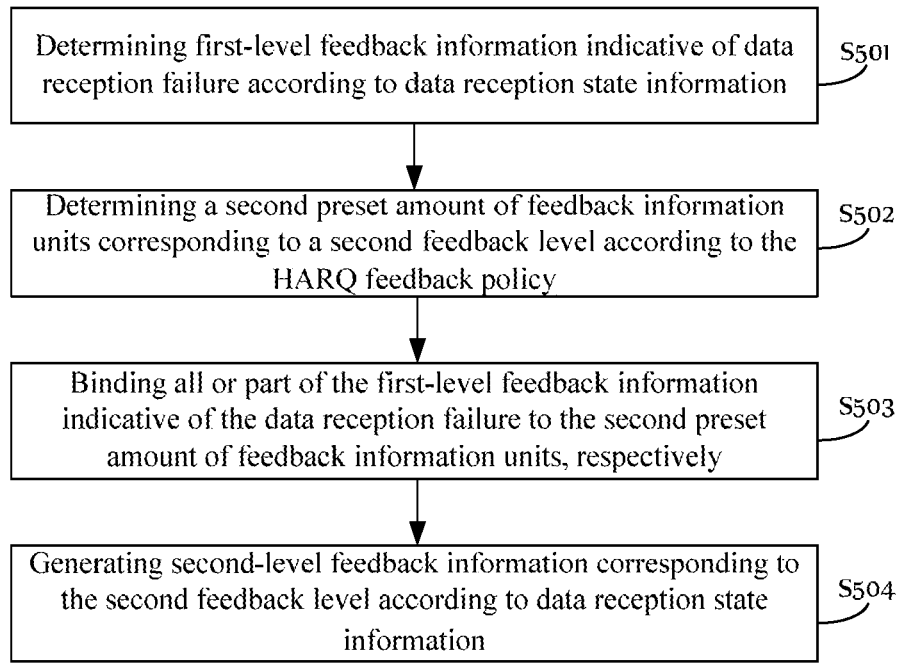
FIG. 5A is a flowchart illustrating another method for generating HARQ feedback information according to an HARQ feedback policy according to an exemplary embodiment of the present disclosure.

FIG. 5A is a flowchart illustrating another method for generating HARQ feedback information based on a resource unit according to an HARQ feedback policy according to an exemplary embodiment of the present disclosure. A second feedback level is added in the embodiment on the basis of the embodiment illustrated in FIG. 4. As illustrated in FIG. 5A, the method can also comprise the following steps.

In step S501, first-level feedback information indicative of data reception failure is determined according to data reception state information.

Since each of the first-level feedback information corresponding to the two bits in FIG. 4B is 0, it can be determined that the first-level feedback information indicative of the data reception failure is two bits.

In step S502, a second preset amount of feedback information units corresponding to a second feedback level is determined according to the HARQ feedback policy.

Since the HARQ feedback policy indicates that the amount of bits corresponding to the second feedback level is 4, it can be determined that the second preset amount is 4.

In step S503, all or part of the first-level feedback information indicative of the data reception failure is bound to the second preset amount of feedback information units, respectively.

The step S503 can comprise the following step: if the first-level feedback information indicative of the data reception failure is greater than one feedback information unit, the first-level feedback information of the at least one feedback information unit, which is indicative of the data reception failure is determined according to the HARQ feedback policy, and resource units corresponding to the determined the first-level feedback information of at least one feedback information unit are bound to the second preset amount of feedback information units.

Since the first-level feedback information indicative of the data reception failure in FIG. 4B is two bits, the first-level feedback information of the least one feedback information unit, which is indicative of the data reception failure, can be determined. For example, the first-level feedback information which reflects the data reception failure of one feedback information unit can be determined or the first-level feedback information which reflects the data reception failure of all of the feedback information units can also be determined.

When the first-level feedback information which reflects the data reception failure of one feedback information unit is determined, the determined first-level feedback information can be bound to the second preset amount of feedback information units respectively. In the embodiment, the determined first-level feedback information is the first-level feedback information corresponding to the first bit in FIG. 4B, and as illustrated in FIG. 5B, the feedback information of the first four CBGs in FIG. 4B is bound to 4 bits respectively.

When the first-level feedback information which reflects the data reception failure of all of the feedback information units is determined, resource units corresponding to the determined first-level feedback information can be bound to the second preset amount of feedback information units. In the embodiment, the determined first-level feedback information is the first-level feedback information corresponding to all bits in FIG. 4B, and as illustrated in FIG. 5C, the feedback information of 8 CBGs in FIG. 4B is bound to 4 bits respectively.

Referring again to FIG. 5A, in step S504, second-level feedback information corresponding to the second feedback level is generated according to data reception state information, and HARQ feedback information further comprises the second-level feedback information.

Figure 5B:
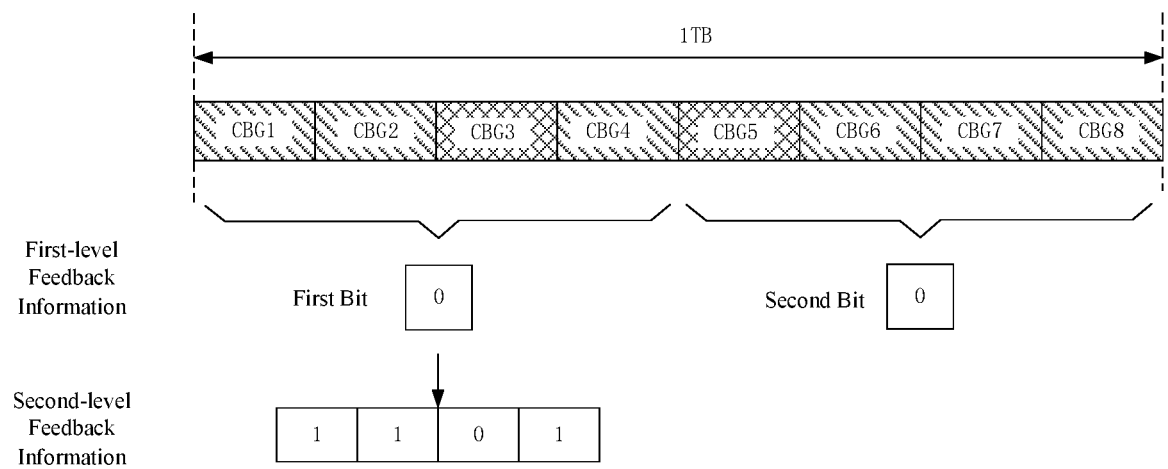
FIG. 5B is a third schematic view illustrating a correspondence relationship between a TB and HARQ feedback information according to an exemplary embodiment of the present disclosure.

For the first four CBGs in FIG. 5B, except that the data reception state information corresponding to CBG3 is data reception failure, the data reception state information corresponding to the other three CBGs is data reception success, therefore the second-level feedback information generated in FIG. 5B is 1101. For FIG. 5B, data required to be retransmitted comprises CBG3, CBG5, CBG6, CBG7 and CBG8, 5 CBGs in total, and for FIG. 4B, all CBGs, i.e., 8 CBGs, need to be retransmitted, therefore the amount of data to be retransmitted can be reduced by adding the second-level feedback information.

Figure 5C:
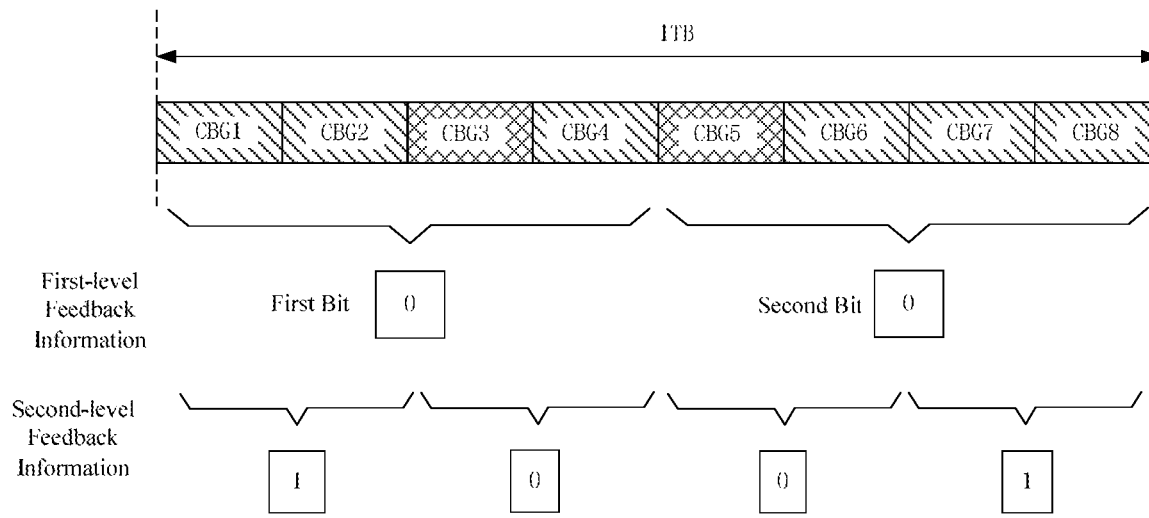
FIG. 5C is a fourth schematic view illustrating a correspondence relationship between a TB and HARQ feedback information according to an exemplary embodiment of the present disclosure.

For the CBGs in FIG. 5C, except that the data reception state information corresponding to CBG3 and CBG5 is data reception failure, the data reception state information corresponding to the other six CBGs is data reception success, therefore the second-level feedback information generated in FIG. 5C is 1001. For FIG. 5C, data required to be retransmitted comprises CBG3, CBG4, CBG5 and CBG6, four CBGs in total, and for FIG. 4B, all CBGs, i.e., 8 CBGs, need to be retransmitted, therefore the amount of data to be retransmitted can be reduced by adding the second-level feedback information.

In the above embodiment, the second feedback level is added and the second-level feedback information corresponding to the second feedback level is generated, so that the second-level feedback information can reflect the data reception state corresponding to the resource units bound to each feedback information unit with a smaller granularity, thus the transmitting end determines data to be retransmitted based on this, so as to reduce the amount of data retransmitted by the transmitting end.

Corresponding to the foregoing embodiments of the HARQ feedback method, the present disclosure further provides embodiments of an HARQ feedback device.

Figure 6:
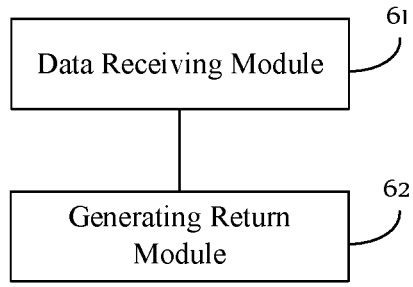
FIG. 6 is a block diagram illustrating an HARQ feedback device according to an exemplary embodiment.

FIG. 6 is a block diagram illustrating an HARQ feedback device according to an exemplary embodiment. As illustrated in FIG. 6, the HARQ feedback device comprises a data receiving module 61 and a generating return module 62.

The data receiving module 61 is configured to receive data transmitted from a transmitting end in a unit of a transmission block (TB), which comprises a plurality of resource units.

The transmitting end can comprise a base station or a UE. If the transmitting end is a base station, the method embodiment is described from the perspective of the UE, namely, and the embodiment is applicable to HARQ feedback of downlink data, and if the transmitting end is the UE, the method embodiment is described from the perspective of the base station, and the embodiment is applicable to HARQ feedback of uplink data.

In the embodiment, the resource units can comprise, but not limited to, CBGs or code blocks (CBs) or the like. FIG.

2 is a schematic view illustrating a TB comprising a plurality of resource units according to an exemplary embodiment of the present disclosure. As illustrated in FIG. 2, one TB 21 can comprise a plurality of CBGs 22, each of which can comprise an amount of Code Blocks (CBs) 23.

The generating return module 62 is configured to generate HARQ feedback information based on the resource units contained in the TB corresponding to the data received by the data receiving module 61 according to a pre-configured HARQ feedback policy, and return the HARQ feedback information to the transmitting end, wherein the amount of feedback information units of the HARQ feedback information is less than the amount of the resource units contained in the TB.

In the embodiment, the HARQ feedback policy can comprise: feedback levels and an amount of feedback information units corresponding to each of the feedback levels; or feedback levels and an amount of resource units bound to one feedback information unit of each of the feedback levels; or feedback levels, an amount of feedback information units corresponding to each of the feedback levels and an amount of resource units bound to one feedback information unit of each of the feedback levels. In the embodiment, at least one feedback level can be comprised.

The sum of the amount of all of the feedback information units corresponding to all of the feedback levels is less than the amount of the resource units contained in the TB. The feedback information units can be bit, namely, the sum of the amount of all of the bits corresponding to all of the feedback levels is less than the amount of the resource units contained in the TB. The amount of the feedback levels can be one, two, three or more, and it is not particularly limited in the embodiment.

Description will be given by taking FIG. 3B as an example. FIG. 3B is a first schematic view illustrating a correspondence relationship between a TB and HARQ feedback information according to an exemplary embodiment of the present application. As illustrated in FIG. 3B, the resource units are CBGs and the feedback information units are bits. The sum of the amount of all of the feedback information units corresponding to all of the feedback levels is 2 and the amount of the resource units contained in the TB is 8. Namely, the sum of the amount of all of the feedback information units corresponding to all of the feedback levels is less than the amount of the resource units contained in the TB.

In the embodiment, feedback information of the resource units can be bound to one feedback information unit on at least one feedback level according to the HARQ feedback policy so as to generate the HARQ feedback information. Since the sum of the amount of all of the bits corresponding to all of the feedback levels is less than the amount of the resource units contained in the TB, the amount of bits of the generated HARQ feedback information is less than the amount of the resource units contained in the TB. For example, if the resource units are CBGs, the sum of the amount of all of the bits corresponding to all of the feedback levels is less than the amount of the CBGs contained in the TB, and if the resource units are CBs, the sum of the amount of all of the bits corresponding to all of the feedback levels is less than the amount of the CBs contained in the TB.

In addition, the HARQ feedback policy can further comprise at least one of a first indication information and a second indication information.

The first indication information is configured to indicate that the HARQ feedback information is returned to the transmitting end in an explicit manner or in an implicit manner. If the first indication information indicates that the HARQ feedback information is returned to the transmitting end in an implicit manner, the HARQ feedback policy can further comprise: scrambling sequence and scrambled data location.

In the embodiment, the feedback levels comprise: a first feedback level and a second feedback level. The scrambled data location is a location of first-level feedback information and second-level feedback information can be scrambled to the first-level feedback information in the form of a scrambling code and sent to the transmitting end, thus, the transmitting end parses the first-level feedback information and the second-level feedback information at the same time after receiving the feedback information.

It is to be understood that the above description is merely an example of scrambling, and in practical applications, it may not be limited to the feedback levels. For example, if there is only one feedback level, the HARQ feedback information can also be scrambled to other data in the form of a scrambling code and then transmitted to the transmitting end.

The second indication information is configured to indicate that the sum of the amount of the feedback information units used in all of the feedback levels is constant or variable. Due to a wider bandwidth of 5G and more dynamic time-frequency resources, the TB may have a dynamic length as required by services, and of course, there may be many CBs in one TB. For one TB, there are the following two cases: the first case, an amount of CBGs comprised in each TB is fixed; and the second case, amount of CBs comprised in one CBG is fixed. For the first case, if the TB comprises 1000 CBs, then each CBG comprises 100 CBs, which inevitably results in big data of individual CBG to be retransmitted, thereby reducing efficiency of retransmission. In order to resolve the problem, the second indication information is introduced, which indicates a sum of the amount of the feedback information units used in the feedback levels is variable, and a plurality of CBs, for example 10 CBs, are bound to one feedback information unit, for example one bit, according to the second indication information, thereby reducing the mount of bits of the feedback information without causing big amount of data to be retransmitted.

The device as illustrated in FIG. 6 is configured to implement the procedures of the method described above and illustrated in FIG. 1 and the description of relevant contents is the same, which will not be elaborated herein.

In the foregoing embodiment, the HARQ feedback information based on the resource units is generated according to the pre-configured HARQ feedback policy, so that the amount of the feedback information units of the HARQ feedback information is less than the amount of the resource units contained in the TB, thereby saving feedback overhead.

Figure 7:
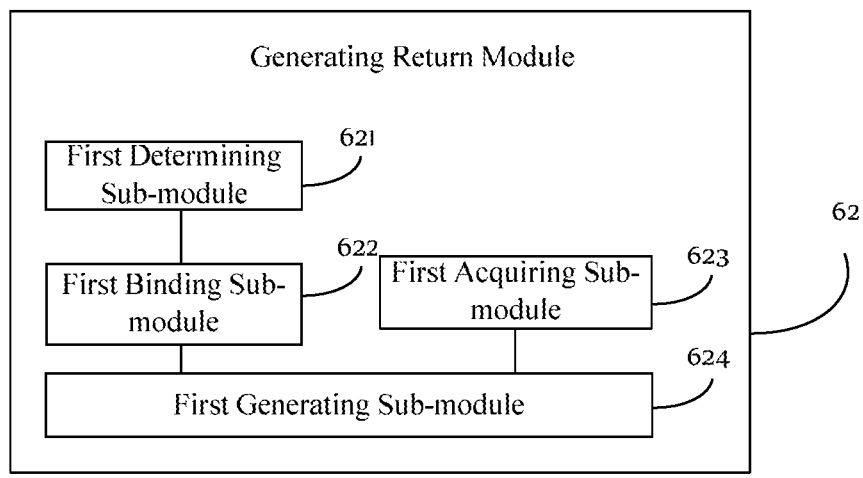
FIG. 7 is a block diagram illustrating another HARQ feedback device according to an exemplary embodiment.

FIG. 7 is a block diagram illustrating another HARQ feedback device according to an exemplary embodiment. As illustrated in FIG. 7, on the basis of the above embodiment illustrated in FIG. 6, an HARQ feedback policy can comprise: feedback levels and an amount of feedback information units corresponding to each of the feedback levels; and the feedback levels can comprise a first feedback level. The generating return module 62 can comprise a first determining sub-module 621, a first binding sub-module 622, a first acquiring sub-module 623 and a first generating sub-module 624.

The first determining sub-module 621 is configured to determine a first preset amount of feedback information units corresponding to the first feedback level according to the HARQ feedback policy.

Since the HARQ feedback policy indicates that the amount of bits corresponding to the first feedback level is 2, it can be determined that the first preset amount is 2.

The first binding sub-module 622 is configured to bind feedback information corresponding to resource units contained in a TB respectively to the first preset amount of feedback information units determined by the first determining sub-module 621.

In the embodiment, FIG. 4B is a second schematic view illustrating a correspondence relationship between a TB and HARQ feedback information according to an exemplary embodiment of the present disclosure. As illustrated in FIG. 4B, the resource units are CBGs and the feedback information units are bits. The first preset amount is 2 and 8 CBGs are contained in the TB, thus feedback information of 8 CBGs can be bound to 2 bits. Namely, feedback information of CBG1, CBG2, CBG3 and CBG4 can be bound to the first bit while feedback information of CBG5, CBG6, CBG7 and CBG8 can be bound to the second bit.

The first acquiring sub-module 623 is configured to obtain data reception state information, which is configured to indicate data reception success or data reception failure corresponding to each of the resource units.

As illustrated in FIG. 4B, if a data reception state corresponding to 1 CBG of 4 CBGs bound to the first bit is data reception failure (for example, the data reception state corresponding to CBG3 is data reception failure), HARQ feedback information corresponding to the first bit is a second value which can be 0 and a data reception state corresponding to 1 CBG of 4 CBGs bound to the second bit is data reception failure (for example, the data reception state corresponding to CBG5 is data reception failure), HARQ feedback information corresponding to the second bit is a second value which can be 0, thus the generated first level feedback information is 00.

The first generating sub-module 624 is configured to generate first-level feedback information corresponding to the first feedback level according to the data reception state information obtained by the first obtaining sub-module 623, wherein HARQ feedback information comprises the first-level feedback information.

In the foregoing embodiment, the feedback information corresponding to the resource units contained in the TB is bound to the first preset amount of feedback information units respectively, and the first-level feedback information corresponding to the first feedback level is generated according to the acquired data reception state information, so that the first-level feedback information can reflect the data reception state corresponding to the resource units bound to each feedback information unit, so as to determine data to be retransmitted by the transmitting end based on this.

Figure 8:
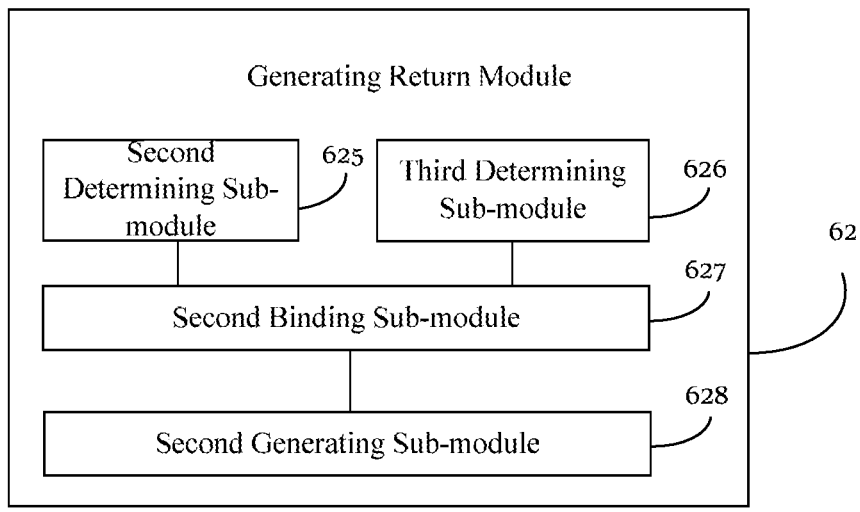
FIG. 8 is a block diagram illustrating another HARQ feedback device according to an exemplary embodiment.

FIG. 8 is a block diagram illustrating another HARQ feedback device according to an exemplary embodiment. As illustrated in FIG. 8, the feedback levels can further comprise a second feedback level. On the basis of the foregoing embodiment illustrated in FIG. 7, the generating return module 62 can further comprise a second determining sub-module 625, a third determining sub-module 626, a second binding sub-module 627 and a second generating sub-module 628.

The second determining sub-module 625 is configured to determine first-level feedback information which reflects data reception failure according to the data reception state information acquired by the first obtaining sub-module.

Since the first-level feedback information corresponding to each of the two bits in FIG. 4B is 0, it can be determined that the first-level feedback information indicative of the data reception failure is two bits.

The third determining sub-module 626 is configured to determine a second preset amount of feedback information units corresponding to the second feedback level according to the HARQ feedback policy.

Since the HARQ feedback policy indicates that the amount of bits corresponding to the second feedback level is 4, it can be determined that the second preset amount is 4.

The second binding sub-module 627 is configured to bind all or part of the first-level feedback information indicative of the data reception failure determined by the second determining sub-module 625 respectively to the second preset amount of feedback information units determined by the third determining sub-module 626.

If the first-level feedback information which reflects the data reception failure is greater than one feedback information unit, the first-level feedback information of the at least one feedback information unit, which reflects the data reception failure is determined according to the HARQ feedback policy, and the determined the first-level feedback information of at least one feedback information unit are bound respectively to the second preset amount of feedback information units.

Since the first-level feedback information which reflects the data reception failure in FIG. 4B is two bits, the first-level feedback information of the least one feedback information unit, which is indicative of the data reception failure can be determined. For example, the first-level feedback information of one feedback information unit which reflects the data reception failure, can be determined, or the first-level feedback information of all of the feedback information units which reflects the data reception failure can also be determined.

The second generating sub-module 628 is configured to generate second-level feedback information corresponding to the second feedback level according to the data reception state information, wherein the HARQ feedback information further comprises the second-level feedback information.

For the first four CBGs in FIG. 5B, except that the data reception state information corresponding to CBG3 is data reception failure, the data reception state information corresponding to each of the other three CBGs is data reception success, therefore the second-level feedback information corresponding to the first four CBGs in FIG. 5B is 1101. For FIG. 5B, data required to be retransmitted comprises CBG3, CBG5, CBG6, CBG7 and CBG8 and for FIG. 4B, all CBGs, i.e., 8 CBGs need to be retransmitted, therefore the amount of data to be retransmitted can be reduced by adding the second-level feedback information.

For the CBGs in FIG. 5C, except that the data reception state information corresponding to CBG3 and CBG5 is data reception failure, the data reception state information corresponding to the other six CBGs is data reception success, therefore the second-level feedback information corresponding to the CBGs in FIG. 5C is 1001. For FIG. 5C, data required to be retransmitted comprises CBG3, CBG4, CBG5 and CBG6 and for FIG. 4B, all CBGs, i.e., 8 CBGs need to be retransmitted, therefore the amount of data to be retransmitted can be reduced by adding the second-level feedback information.

In the above embodiment, the second feedback level is added and the second-level feedback information corresponding to the second feedback level is generated, so that the second-level feedback information can reflect the data reception state corresponding to the resource units bound to each feedback information unit with a smaller granularity, thus the transmitting end determines data to be retransmitted based on this, so as to reduce the amount of data retransmitted by the transmitting end.

Figure 9:
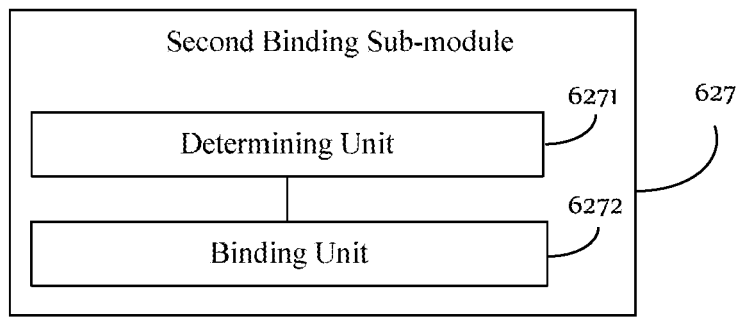
FIG. 9 is a block diagram illustrating another HARQ feedback device according to an exemplary embodiment.

FIG. 9 is a block diagram illustrating another HARQ feedback device according to an exemplary embodiment. As illustrated in FIG. 9, on the basis of the above embodiment illustrated in FIG. 8, the second binding sub-module 627 can comprise: a determining unit 6271 and a binding unit 6272.

The determining unit 6271 is configured to determine, if the first-level feedback information which reflects the data reception failure is greater than one feedback information unit, the first-level feedback information of the at least one feedback information unit, which reflects the data reception failure according to the HARQ feedback policy.

The binding unit 6272 is configured to bind the first-level feedback information of the at least one feedback information unit determined by the determining unit 6271 respectively to the second preset amount of feedback information units.

When the first-level feedback information of one feedback information unit which reflects the data reception failure is determined, the determined first-level feedback information can be bound to the second preset amount of feedback information units respectively. In the embodiment, the determined first-level feedback information is the first-level feedback information corresponding to the first bit in FIG. 4B, and as illustrated in FIG. 5B, the feedback information of the first four CBGs in FIG. 4B is bound to 4 bits respectively.

When the first-level feedback information of all feedback information units which reflects the data reception failure is determined, resource units corresponding to the determined first-level feedback information can be bound to the second preset amount of feedback information units. In the embodiment, the determined first-level feedback information is the first-level feedback information corresponding to all bits in FIG. 4B, and as illustrated in FIG. 5C, the feedback information of 8 CBGs in FIG. 4B is bound to 4 bits respectively.

In the above embodiment, the determined first-level feedback information of the at least one feedback information unit is bound respectively to the second preset amount of feedback information units, so as to provide conditions for subsequently generating the second-level feedback information, which can be implemented flexibly in various ways.

Figure 10:
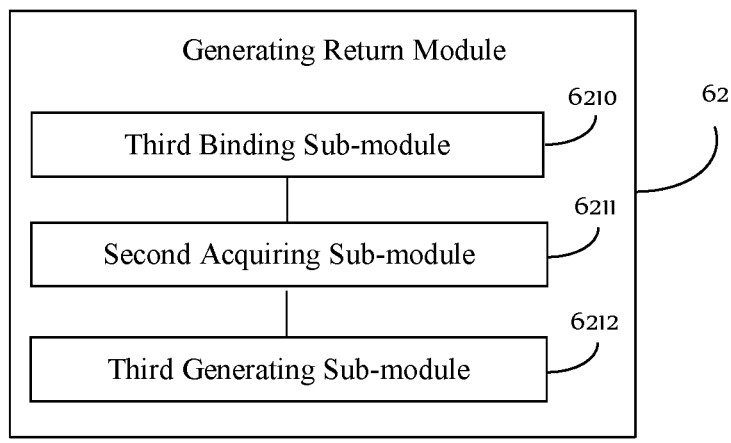
FIG. 10 is a block diagram illustrating another HARQ feedback device according to an exemplary embodiment.

FIG. 10 is a block diagram illustrating another HARQ feedback device according to an exemplary embodiment. As illustrated in FIG. 10, on the basis of the above embodiment illustrated in FIG. 6, an HARQ feedback policy can comprise: a feedback level and an amount of resource units bound to one feedback information unit in each feedback level, wherein the amount of the feedback level is one. The generating return module 62 can comprise: a third binding sub-module 6210, a second acquiring sub-module 6211 and a third generating sub-module 6213.

The third binding sub-module 6210 is configured to bind feedback information corresponding to resource units contained in a TB respectively to a third preset amount of feedback information units. The third preset amount is equal to a rounding-up number of a value, which is obtained through dividing the amount of resource units contained in the TB by the amount of resource units bound to one feedback information unit in a feedback level.

In the embodiment, the resource units in the embodiment are CBGs and the feedback information units are bits and the amount of CBGs bound to one bit in the feedback level is 4. FIG. 3B is a schematic view illustrating a correspondence relationship between a TB and HARQ feedback information according to an exemplary embodiment of the present disclosure. As illustrated in FIG. 3B, the TB comprises 8 CBGs and feedback information corresponding to CBG1, CBG2, CBG3 and CBG4 can be bound to the first bit while feedback information corresponding to CBG5, CBG6, CBG7 and CBG8 can be bound to the second bit.

In addition, if the TB comprises 10 CBGs, namely, the TB further comprises CBG9 and CBG10, feedback information corresponding to the CBG9 and CBG10 can be bound to a third bit.

The second acquiring sub-module 6211 is configured to acquire data reception state information, which is configured to indicate data reception success or data reception failure corresponding to each of the resource units.

The third-generation sub-module 6213 is configured to generate HARQ feedback information according to the data reception state information acquired by the second acquiring sub-module 6211.

If a data reception state corresponding to 4 CBGs bound to the current bit is the data reception success, the HARQ feedback information corresponding to the current bit is a first value that is, for example, 1 and if a data reception state corresponding to 1 CBG of 4 CBGs bound to the current bit is data reception failure, HARQ feedback information corresponding to the current bit is a second value, for example 0. In FIG. 3B, except that the data reception state information corresponding to CBG5 is data reception failure, the data reception state information corresponding to each of the other seven CBGs is data reception success, therefore the HARQ feedback information corresponding to the CBGs in FIG. 3B is 10.

In the foregoing embodiment, the feedback information corresponding to the resource units contained in the TB is bound to the third preset amount of feedback information units respectively, and the HARQ feedback information is generated according to the acquired data reception state information, so that the HARQ feedback information can reflect the data reception state corresponding to the resource units bound to each feedback information unit, so as to determine data to be retransmitted by the transmitting end based on this.

Figure 11:
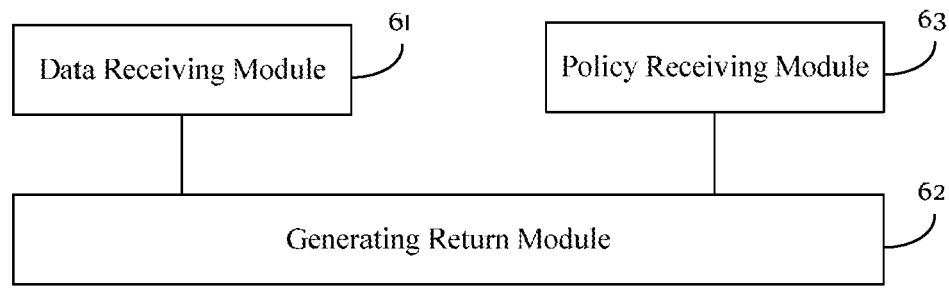
FIG. 11 is a block diagram illustrating still another HARQ feedback device according to an exemplary embodiment.

FIG. 11 is a block diagram illustrating another HARQ feedback device according to an exemplary embodiment. As illustrated in FIG. 11, on the basis of the above embodiment illustrated in FIG. 6, if the transmitting end in the embodiment is a base station, the device can further comprise a policy receiving module 63.

The policy receiving module 63 is configured to receive an HARQ feedback policy transmitted from the transmitting end before the generating return module 62 generates HARQ feedback information based on the resource units contained in the TB corresponding to the data received by the data receiving module according to a pre-configured HARQ feedback policy.

In the foregoing embodiment, the HARQ feedback policy transmitted from the transmitted end is received, so as to provide conditions for subsequently generating the HARQ feedback information based on the resource units according to the HARQ feedback policy.

Figure 12:
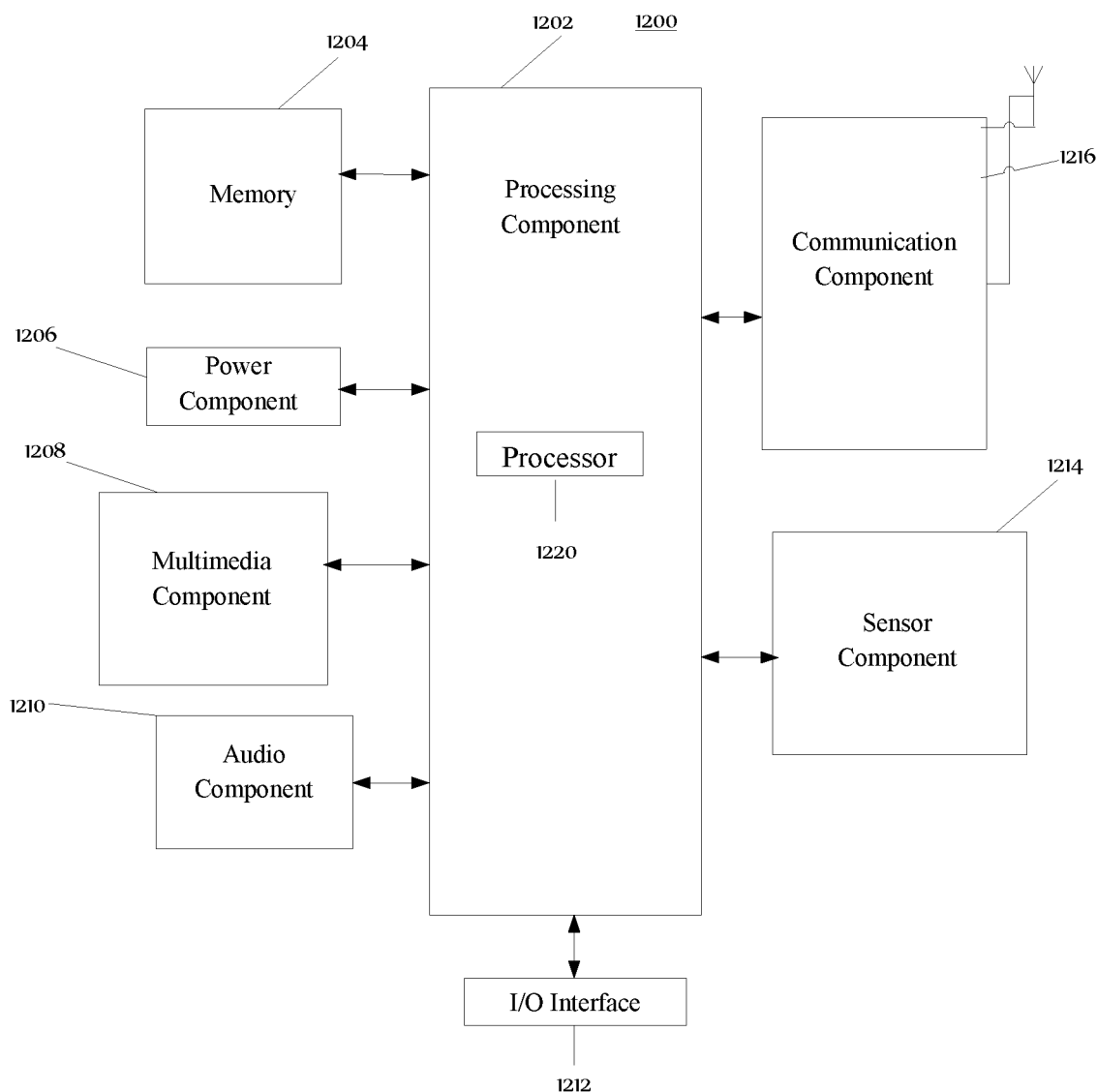
FIG. 12 is a block diagram illustrating components applicable to an HARQ feedback device according to an exemplary embodiment.

FIG. 12 is a block diagram illustrating components applicable to an HARQ feedback device according to an exemplary embodiment. For example, a device 1200 can be a mobile phone, a computer, a digital broadcast terminal, a messaging device, a gaming console, a tablet device, a medical device, exercise equipment, a personal digital assistant, and the like.

Referring to FIG. 12, the device 1200 can comprise one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls overall operations of the device 1200, such as the operations associated with display, telephone calls, data communications, camera operations, and recording operations. The processing component 1202 can comprise one or more processors 1220 to execute instructions so as to perform all or part of the steps in the above described methods. Moreover, the processing component 1202 can comprise one or more modules which facilitate interaction between the processing component 1202 and other components. For instance, the processing component 1202 can comprise a multimedia module to facilitate interaction between the multimedia component 1208 and the processing component 1202.

The memory 1204 is configured to store various types of data to support the operation of the device 1200. Examples of such data comprise instructions for any applications or methods operated on the device 1200, contact data, phonebook data, messages, pictures, video, and etc. The memory 1204 can be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 can comprise a power management system, one or more power sources, and any other components associated with generation, management, and distribution of power for the device 1200.

The multimedia component 1208 comprises a screen providing an output interface between the device 1200 and the user. In some embodiments, the screen can comprise a liquid crystal display (LCD) and a touch panel (TP). If the screen comprises a touch panel, the screen can be implemented as a touch screen to receive input signals from the user. The touch panel comprises one or more touch sensors to sense touches, swipes, and gestures on the touch panel. The touch sensors can not only sense a boundary of a touch or swipe action, but also sense duration and a pressure associated with the touch or swipe action. In some embodiments, the multimedia component 808 comprises a front camera and/or a rear camera. The front camera and/or the rear camera can receive external multimedia data while the device 1200 is in an operation mode, such as a photographing mode or a video mode. Each of the front camera and the rear camera can be an optical lens system with fixed focus length or has focus and optical zoom capability.

The audio component 1210 is configured to output and/or input audio signals. For example, the audio component 1210 comprises a microphone ("MIC") configured to receive an external audio signal when the device 1200 is in an operation mode, such as a call mode, a recording mode, and a voice recognition mode. The received audio signal can be further stored in the memory 1204 or transmitted via the communication component 1216. In some embodiments, the audio component 1210 further comprises a speaker to output audio signals.

The I/O interface 1212 provides an interface between the processing component 1202 and peripheral interface modules, such as a keyboard, a click wheel, a button, and the like. The buttons may comprise, but are not limited to, a home button, a volume button, a starting button, and a locking button.

The sensor component 1214 comprises one or more sensors to provide status assessments of various aspects of the device 1200. For instance, the sensor component 1214 can detect an open/closed status of the device 1200, relative positioning of components, e.g., the display and the keypad, of the device 1200. The sensor component 1214 can further detect a change in position of the device 1200 or a component of the device 1200, a presence or absence of user contact with the device 1200, an orientation or an acceleration/deceleration of the device 1200, and a change in temperature of the device 1200. The sensor component 1214 can comprise a proximity sensor configured to detect the presence of nearby objects without any physical contact. The sensor component 1214 can also comprise a light sensor, such as a CMOS or CCD image sensor, for use in imaging applications. In some embodiments, the sensor component 1214 can further comprise an accelerometer sensor, a gyroscope sensor, a magnetic sensor, a pressure sensor, or a temperature sensor.

The communication component 1216 is configured to facilitate communication, wired or wireless, between the device 1200 and other devices. The device 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further comprises a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is further provided a non-transitory computer readable storage medium including instructions, such as a memory 1204 comprising instructions, executable by the processor 1220 in the device 1200, for performing the above-described methods. For example, the non-transitory computer-readable storage medium can be a ROM, a RAM, a CD-ROM, a magnetic tape, a floppy disc, an optical data storage device, and the like.

Figure 13:
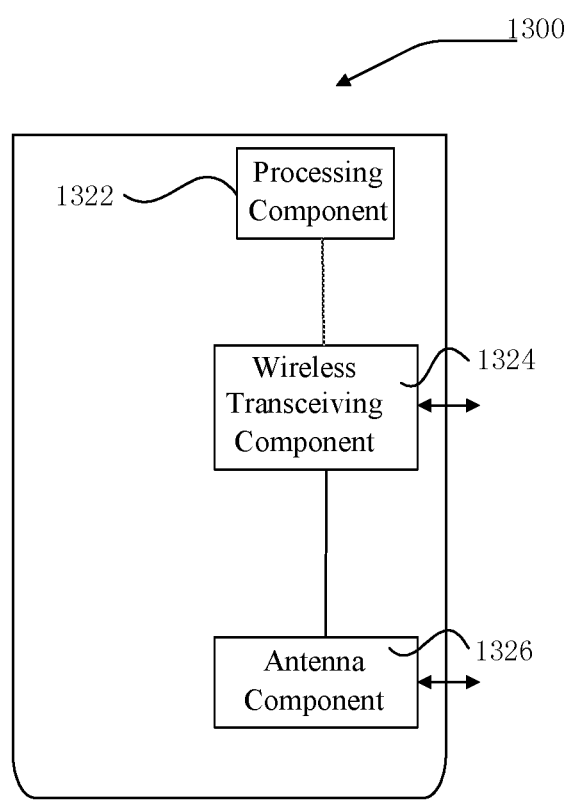
FIG. 13 is a block diagram illustrating components applicable to an HARQ feedback device according to an exemplary embodiment.

FIG. 13 is a block diagram illustrating components applicable to an HARQ feedback device according to an exemplary embodiment. A device 1300 can be provided as a base station. Referring to FIG. 13, the device 1300 comprises a processing component 1322, a wireless transceiving component 1324, an antenna component 1326 and a signal processing section specific to a wireless interface. The processing component 1322 can further comprise one or more processors.

One processor of the processing component 1322 can be configured to:

receive data transmitted from a transmitting end in a unit of a transmission block (TB), which comprises a plurality of resource units;

generate HARQ feedback information based on the resource units according to a pre-configured HARQ feedback policy, and return the HARQ feedback information to the transmitting end, wherein the amount of feedback information units of the HARQ feedback information is less than the amount of the resource units contained in the TB.

Since the device embodiments basically correspond to the method embodiments, reference can be made to the method embodiments for relevant contents. The above-described device embodiments are exemplary only and the units described as separated parts may or may not be physically separated, and the parts illustrated as a unit may or may not be a physical unit, that is, may be located in one place, or may be distributed on multiple network units. Some or all of the modules may be selected according to actual requirements to achieve the objectives of the solutions in the embodiments. One of ordinary skill in the art can understand and carry out them without any creative labor.

It should also be noted that, in this text, relational terms such as first and second, etc., are only used to distinguish one entity or operation from another entity or operation, and do not necessarily require or imply any such actual relations or orders present between the entities or operations. The terms "comprising", "containing" or any other variations thereof are intended to cover a non-exclusive inclusion such that processes, methods, articles, or devices that contain a series of elements comprise not only those elements but also comprise other elements that are not explicitly listed. Alternatively, elements inherent to such processes, methods, articles, or devices can also be comprised. In case of no more limitations, an element defined by phase "comprising a . . . " does not exclude the situation where additional identical elements are present in the processes, the methods, the articles, or the devices comprising the element.

The method and device provided by the embodiments of the present disclosure are described above in detail. Specific examples are used herein to describe the principles and embodiments of the present disclosure. The description of the embodiments above is only intended to help the understanding of the method and its gist of the present disclosure; meanwhile, one of ordinary skill in the art, according to the idea of the present disclosure, will make changes in the specific embodiments and application ranges. In summary, the contents of this description should not be constructed as limiting the present disclosure.

The invention claimed is:

1. A hybrid automatic repeat request (HARQ) feedback method, comprising:

receiving data transmitted from a transmitting end in a unit of a transmission block (TB), which contains a plurality of continuous first code block group (CBG) and a plurality of continuous second CBG; and generating HARQ feedback information according to a HARQ feedback policy, and returning the HARQ feedback information to the transmitting end, wherein an amount of bits of the HARQ feedback information is smaller than an amount of the CBGs contained in the TB;

wherein the HARQ feedback policy comprises:

binding feedback information of the plurality of continuous first CBGs to a first bit on a first feedback level;

binding feedback information of a plurality of CBGs to another bit on a second feedback level;

first indication information, which is configured to indicate that the HARQ feedback information is returned to the transmitting end in an implicit manner; and second indication information, which is configured to indicate whether a sum of amounts of feedback information units configured in all of feedback levels is constant or variable;

wherein the generating HARQ feedback information according to the HARQ feedback policy comprises generating a second-level feedback information corresponding to the second feedback level according to data reception state information, wherein the HARQ feedback information further comprises the second-level feedback information.

2. The method according to claim 1, further comprising:

acquiring the data reception state information, which is configured to indicate data reception success or data reception failure corresponding to each of the CBGs; and determining first-level feedback information corresponding to the first feedback level and the second-level feedback information corresponding to the second feedback level, according to the acquired data reception state information, wherein the HARQ feedback information comprises the first-level feedback information and the second-level feedback information.

3. The method according to claim 1, wherein the HARQ feedback policy further comprises: scrambling sequence and a scrambled data location.

4. The method according to claim 3, wherein the scrambled data location is a location of the first-level feedback information and the second-level feedback information is scrambled to the first-level feedback information in a form of a scrambling code and sent to the transmitting end.

5. An apparatus, comprising:

a processor;

a storage for storing instructions executable by the processor;

wherein the processor is configured to:

receive data transmitted from a transmitting end in a unit of a transmission block (TB), which contains a plurality of continuous first code block group (CBG) and a plurality of continuous second CBG; and generate HARQ feedback information according to a HARQ feedback policy, and return the HARQ feedback information to the transmitting end, wherein an amount of bits of the HARQ feedback information is smaller than an amount of the CBGs contained in the TB, wherein the HARQ feedback policy comprises:

binding feedback information of the plurality of continuous first CBGs to a first bit on a first feedback level;

binding feedback information of a plurality of CBGs to another bit on a second feedback level;

first indication information, which is configured to indicate that the HARQ feedback information is returned to the transmitting end in an implicit manner; and second indication information, which is configured to indicate whether a sum of amounts of feedback information units configured in all of feedback levels is constant or variable;

wherein the processor is configured to generate the HARQ feedback information according to the HARQ feedback policy by generating a second-level feedback information corresponding to the second feedback level according to data reception state information, wherein the HARQ feedback information further comprises the second-level feedback information.

6. The apparatus according to claim 5, further comprising:
acquire the data reception state information, which is configured to indicate data reception success or data reception failure corresponding to each of the CBGs; and
determine first-level feedback information corresponding to the first feedback level and the second-level feedback information corresponding to the second feedback level, according to the acquired data reception state information, wherein the HARQ feedback information comprises the first-level feedback information and the second-level feedback information.

7. The apparatus according to claim 5,
wherein the HARQ feedback policy further comprises: scrambling sequence and a scrambled data location.

8. The apparatus according to claim 7, wherein the scrambled data location is a location of the first-level feedback information and the second-level feedback information is scrambled to the first-level feedback information in a form of a scrambling code and sent to the transmitting end.

* * * * *